(12) United States Patent
Lee et al.

(10) Patent No.: US 10,893,205 B2
(45) Date of Patent: Jan. 12, 2021

(54) IMAGE DISPLAY METHOD AND IMAGE DISPLAY DEVICE USING THE SAME

(71) Applicant: Qisda Corporation, Taoyuan (TW)

(72) Inventors: Tsung-Hung Lee, Taoyuan (TW); Wei-Huan Lee, Taipei (TW)

(73) Assignee: Qisda Corporation, Taoyuan (TW)

( * ) Notice: Subject to any disclaimer, the term of this patent is extended or adjusted under 35 U.S.C. 154(b) by 0 days.

(21) Appl. No.: 16/403,640

(22) Filed: May 6, 2019

(65) Prior Publication Data

US 2019/0387177 A1 Dec. 19, 2019

(30) Foreign Application Priority Data

Jun. 19, 2018 (CN) .......................... 2018 1 0631679

(51) Int. Cl.
*H04N 5/232* (2006.01)
*G06T 7/00* (2017.01)
*H04N 5/272* (2006.01)

(52) U.S. Cl.
CPC ....... *H04N 5/232945* (2018.08); *H04N 5/272* (2013.01)

(58) Field of Classification Search
None
See application file for complete search history.

(56) References Cited

U.S. PATENT DOCUMENTS

2014/0096007 A1* 4/2014 Itoh .......................... G06F 16/50
715/732

\* cited by examiner

*Primary Examiner* — Mark T Monk

(57) ABSTRACT

An image display method and an image display device using the same are provided. The image display method includes the following steps. Firstly, a picture is obtained. Then, the content of the part of the picture corresponding to the characteristic parameter is captured as an object image when the content of the picture matches a characteristic parameter. Then, the object image is captured as a click image. Then, the first display portion of the picture is displayed and the click image is superimposed on the first display portion. Then, the second display portion of the picture is displayed in response to the operation of selecting the superimposed click image, wherein the second display portion contains the object image and a background image thereof. Thus, through the selection with respect to the click image, the display device switches the display frame to a frame with object image.

16 Claims, 9 Drawing Sheets

IMAGE DISPLAY METHOD AND IMAGE DISPLAY DEVICE USING THE SAME

This application claims the benefit of People's Republic of China application Serial No. 201810631679.2, filed on Jun. 19, 2018, the subject matter of which is incorporated herein by reference.

BACKGROUND OF THE INVENTION

Field of the Invention

The invention relates in general to an image display method and an image display device using the same, and more particularly to an image display method capable of clicking image and an image display device using the same.

Description of the Related Art

When the content of the displayed picture displays many objects, the user needs to carefully check partial display frames using his/her eyes in order to locate a particular object image from a spherical picture or a film. This job is indeed very exhausting and time consuming. Therefore, it has become a prominent task for the industries to provide a method to quickly locate a target object image from a picture containing many object images.

SUMMARY OF THE INVENTION

The invention is directed to an image display method and an image display device using the same capable of resolving the problems encountered in the current technology.

According to one embodiment of the present invention, an image display method is provided. The image display method includes the following steps. Firstly, a picture is obtained. Then, a first object image corresponding to a characteristic parameter is captured from the picture when the content of the picture matches the characteristic parameter. Then, the first object image is set as a first click image. Then, the first click image is superimposed on a first display portion of the picture. Then, the first display portion of the picture and the first click image are displayed. Then, a second display portion of the picture is displayed in response to the operation of selecting the first click image, wherein the second display portion contains the first object image and a background image thereof.

According to another embodiment of the present invention, an image display device is provided. The image display device includes an image capture unit, an image superimposing unit and a display screen. The image capture unit is configured to: obtain a picture; capture a first object image corresponding to a first characteristic parameter from the picture when the content of the picture matches the first characteristic parameter; and set the first object image as a first click image. The image superimposing unit is configured to superimpose the first click image on a first display portion of the picture. The display screen is configured to display the first display portion and the first click image. The display screen is further configured to: in response to display a second display portion of the picture in response to the operation of selecting the superimposed first click image, wherein the second display portion contains the first object image and a background image thereof.

According to an alternate embodiment of the present invention, an image display method is provided. The image display method includes the following steps: A video string is obtained, wherein the video string has at least one picture, a first video sub-string and a second video sub-string; a first object image corresponding to a first characteristic parameter is captured from the at least one picture when the content of the at least one picture matches the first characteristic parameter; the first object image is set as a first click image; the first click image is superimposed on a first display portion of the first video sub-string; the first display portion and the superimposed first click image are displayed; a second display portion of the second video sub-string is displayed in response to the operation of selecting the first click image, wherein the second display portion contains the first object image and a background image thereof.

The above and other aspects of the invention will become better understood with regard to the following detailed description of the preferred but non-limiting embodiment(s). The following description is made with reference to the accompanying drawings.

DETAILED DESCRIPTION OF THE INVENTION

Principles or the structure and the operation of the present invention are disclosed below with accompanying drawings.

Figure 1:
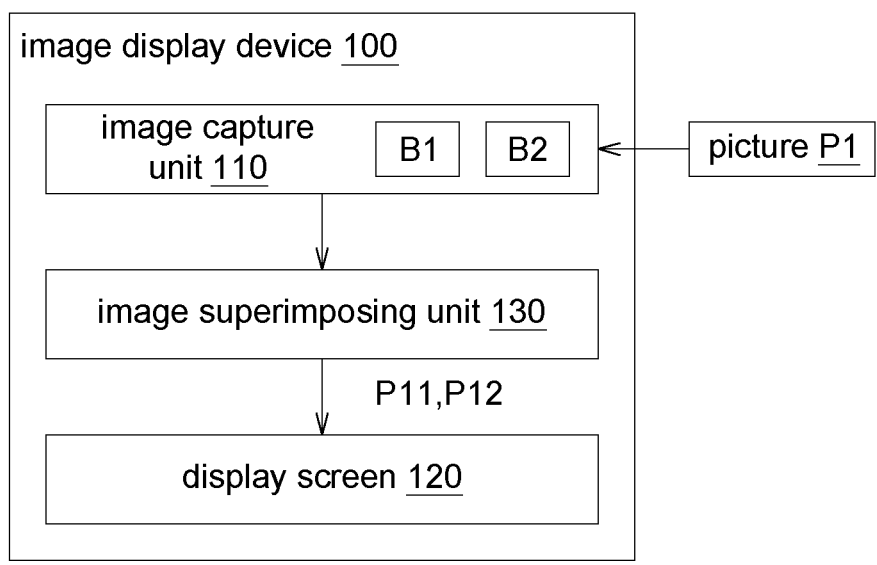
FIG. 1 is a functional block diagram of an image display device according to an embodiment of the present invention.
Figure 2:
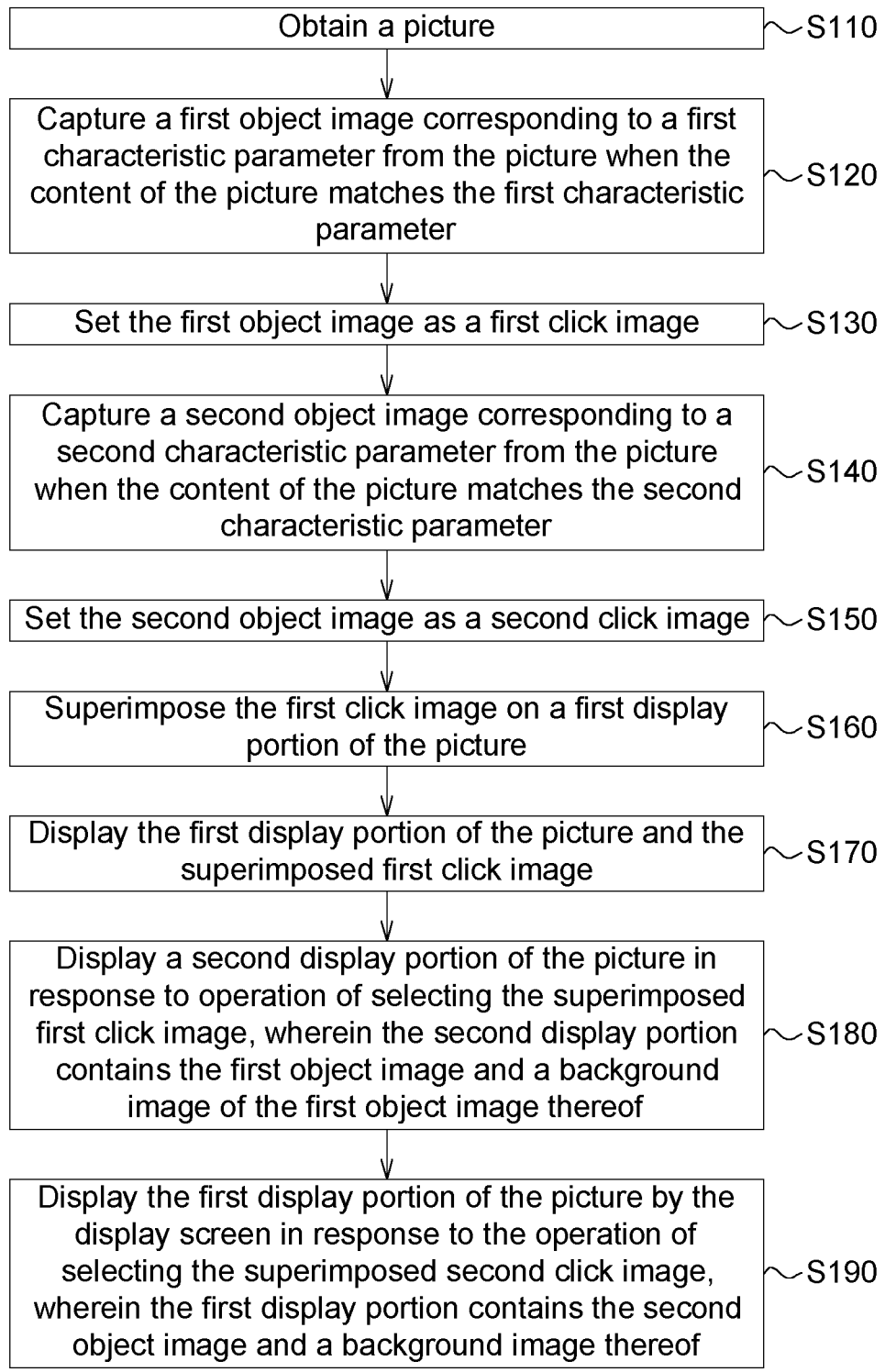
FIG. 2 is a flowchart of an image display method according to an embodiment of the present invention.
Figure 3A:
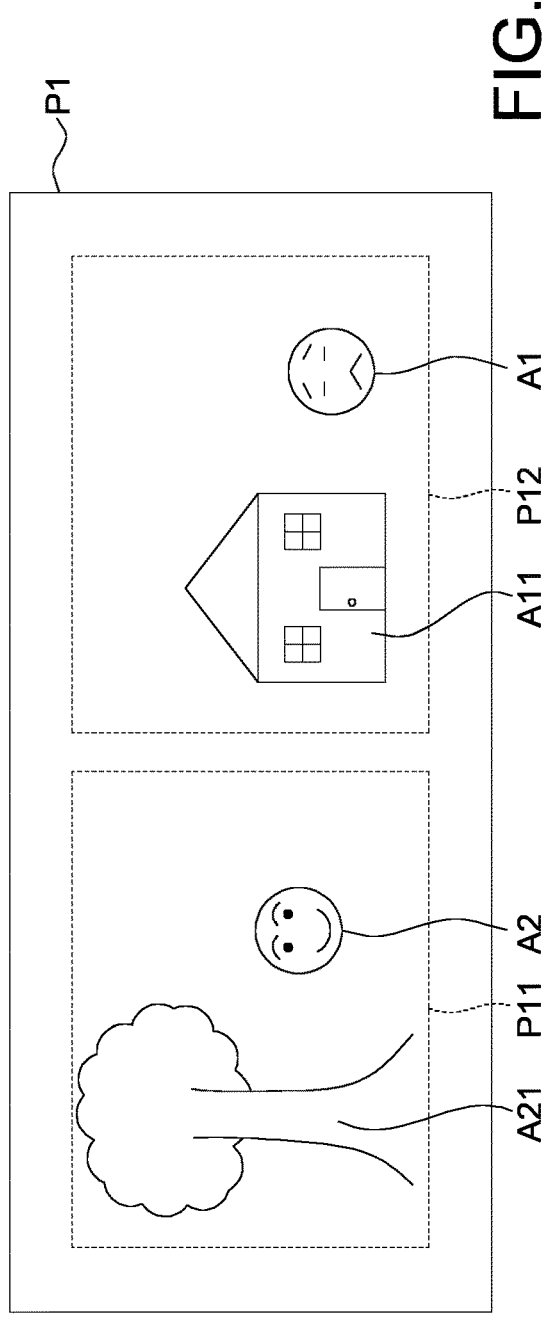
FIG. 3A is a schematic diagram of a picture according to an embodiment of the present invention.
Figure 3C:
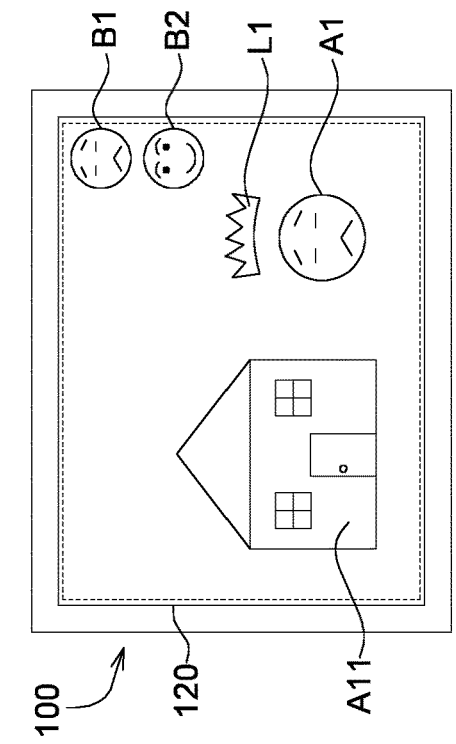
FIG. 3C is a schematic diagram of the display screen of FIG. 1 showing a second display portion of the picture.
Figure 3B:
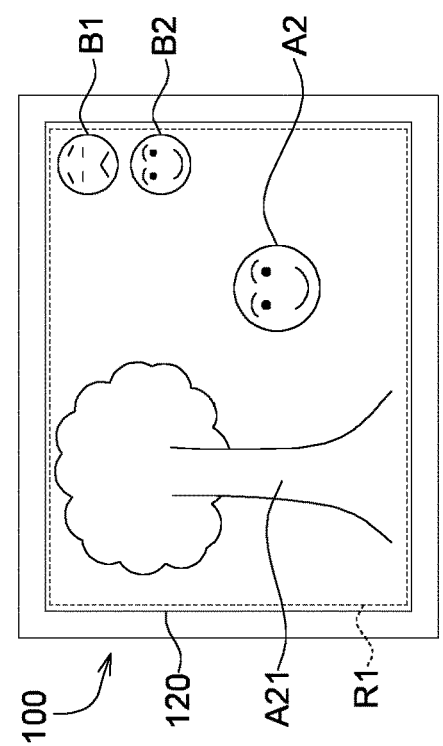
FIG. 3B is a schematic diagram of the display screen of FIG. 1 showing a first display portion of the picture.

Refer to FIGS. 1, 2, and 3A~3B. FIG. 1 is a functional block diagram of an image display device 100 according to an embodiment of the present invention. FIG. 2 is a flowchart of an image display method according to an embodiment of the present invention. FIG. 3A is a schematic diagram of the picture P1 according to an embodiment of the present invention. FIG. 3B is a schematic diagram of the display screen 120 of FIG. 1 showing a first display portion P11 of the picture P1. FIG. 3C is a schematic diagram of the display screen 120 of FIG. 1 showing a second display portion P12 of the picture P1.

As indicated in FIG. 1, the image display device 100 includes an image capture unit 110, a display screen 120 and an image superimposing unit 130. The image capture unit 110 and/or the image superimposing unit 130 can be realized by hardware or software or firmware formed of programming codes, wherein the hardware can be a circuit formed by at least one semiconductor process. Besides, the image capture unit 110 and the image superimposing unit 130 can be integrated as one unit. In another embodiment, the image display device 100 further includes a controller (not illustrated) configured to receive a signal from the image capture unit 110 and/or the image superimposing unit 130 for controlling the image capture unit 110, the display screen 120 and/or the image superimposing unit 130. Moreover, the display screen 120 can be realized by such as a touch screen.

Detailed descriptions of the image display method according to an embodiment of the present invention are disclosed below with FIG. 2.

In step S110, as indicated in FIG. 3A, a picture P1 can be obtained by the image capture unit 110 or read by a storage unit, wherein the picture P1 can be a spherical image, a cylindrical image or a wide view image, and each of the spherical image, the cylindrical image and the wide view image is a large-sized long-strip picture. When the display screen 120 displays a full picture of the same kind, the content of the picture is normally squeezed on the display frame and becomes very difficult for the user to locate a target object image. Normally, the display screen 120 will display only a part of the picture. If the user wants to locate the target object not displayed on the current display frame, the user can translate the display frame horizontally or vertically. The present embodiment discloses an image display method enabling the user to quickly locate the target object image. Detailed descriptions are disclosed below.

In step S120, a first object image A1 corresponding to a first characteristic parameter is captured from the picture P1 by the image capture unit 110 when the content of the picture P1 matches the first characteristic parameter. In the present embodiment, the first characteristic parameter is not limited to a particular type, and can be the characteristics of a human face, a vehicle plate, a plant, an animal, a transportation or other type. In the present embodiment, the first characteristic parameter is exemplified by a particular human face. As indicated in FIG. 3A, since a content of at least part of the picture P1 matches the characteristics of the particular human face, the image capture unit 110 captures the first object image A1 corresponding to the first characteristic parameter from the picture P1. For example, the first characteristic parameter is related to a human face, the image capture unit 110 captures an image of a human face from the picture P1 as the first object image A1.

In step S130, the first object image A1 is set by the image capture unit 110 as a first click image B1 (illustrated in FIG. 3B).

In step S140, a second object image A2 corresponding to a second characteristic parameter is captured from the picture P1 by the image capture unit 110 when the content of the part of the picture P1 matches the second characteristic parameter. In the present embodiment, the second characteristic parameter is also exemplified by a particular human face. As indicated in FIG. 3A, a content of at least part of the picture P1 matches the characteristics of the particular human face, an image of a human face corresponding to a second characteristic parameter is captured by the image capture unit 110 as the second object image A2.

In the present embodiment, the number of object images is not specified. In another embodiment, the number of the object images matching the characteristic parameter can be more than 2. The determination of actual number of object images depends the content of the picture P1, and is not specified in the present embodiment. In another embodiment, when the picture P1 does not contain any object images matching the characteristic parameter, the image capture unit 110 can output a signal indicating that no object image is found. Based on the signal indicating that no object image is found, the display screen 120 can output a message indicating that no object image is found. The message can be such as a text.

In step S150, the second object image A2 is set by the image capture unit 110 as a second click image B2 (illustrated in FIG. 3B).

In step S160, the first click image B1 and the second click image B2 are superimposed on the first display portion P11 of the picture P1 by the image superimposing unit 130. In the present embodiment, the first display portion P11 is a part of the picture P1.

In step S170, as indicated in FIG. 3B, the first display portion P11 is displayed on the display screen 120. That is, the display frame R1 of the display screen 120 displays the first display portion P11 of FIG. 3A along with the first click image B1 and the second click image B2 both are superimposed on the first display portion P11. As indicated in FIG. 3B, the first click image B1 and the second click image B2 can be displayed at the top right corner of the display frame R1 of the display screen 120. However, the first click image B1 and the second click image B2 can be displayed at the bottom right corner, the top left corner or the bottom left corner of the display frame R1 of the display screen 120.

In step S180, as indicated in FIG. 3C, the user can select the first click image B1 displayed on the display screen 120. For example, the user can directly touch the display screen 120 to select the first click image B1; or, the user can select the first click image B1 through an input device (such as a keyboard or a mouse). In response to the operation of selecting the superimposed first click image B1, the display screen 120 displays the second display portion P12 of the picture P1, wherein the second display portion P12 contains the first object image A1 and a background image A11 thereof.

To summarize, when the first click image B1 is selected, the display screen 120 displays the first object image A1 corresponding to the first click image B1 and the background image A11 of the first object image A1. Thus, even when the content of the picture P1 displayed on the display screen 120 has multiple object images or the display screen 120 only displays a content of a part of the picture P1, the object image corresponding to the click image still can be quickly located as long as the click image is selected.

The background image A11 and the first object image A1 may do not overlap at all or may at least partly overlap. The second display portion P12 and the first display portion P11 can be two regions not overlapping at all or at least partly overlapping in the picture P1.

Furthermore, the display screen 120 of FIG. 3B only displays a part of the picture P1, that is, the first display portion P11. Although the first display portion P11 does not contain the first object image A1, the user still can select the first click image B1, which is already displayed on the display screen 120, and then switches the display frame R1 to the frame containing the first object image A1 and the background image A11 thereof (such as the frame of FIG. 3C).

Moreover, as indicated in FIG. 3C, to highlight the position of the first object image A1, the image superimposing unit 130 can superimpose an indication image L1 on the first object image A1 of the second display portion P12, such that the frame of FIG. 3C contains the indication image L1. In an embodiment, the indication image L1 is adjacent to the first object image A1. For example, the indication image L1 is close to the first object image A1 but does not overlap the first object image A1; or, the indication image L1 at least partly overlaps the first object image A1. Additionally, the color and/or the pattern of the indication image L1 are in contrast to that of the first object image A1, such that the user can quickly locate the first object image A1. For example, when the first object image A1 belongs to a dark color system, the indication image L1 can belong to a bright color system. Or, when the first object image A1 has a smooth and circular pattern, the indication image L1 can have a sharp pattern. In another embodiment, the image display method can omit the step of superimposing the indication image L1.

In step S190, the user can select the second click image B2 displayed on the display screen 120. In response to the operation of selecting the superimposed second click image, the display screen 120 displays the first display portion P11 of the picture P1, wherein the first display portion P11 contains the second object image A2 and a background image A21 thereof. Although FIG. 3B does not illustrate the indication image L1, in the present step, the image superimposing unit 130 still can superimpose the indication image L1 on the second object image A2 of the first display portion P11, wherein the indication image L1 is adjacent to the second object image A2 to highlight the position of the second object image A2. The characteristics of the indication image L1 and the second object image A2 disclosed above can be identical or similar to corresponding characteristics of the indication image L1 and the first object image A1, and are not repeated here.

The display screen 120 of FIG. 3C only displays a part of the picture P1, that is, the second display portion P12. Although the second display portion P12 does not contain the second object image A2, the user still can select the second click image B2, which is already displayed on the display screen 120, and then switches the display frame R1 to the frame containing the second object image A2 and a background image A21 thereof (such as the frame of FIG. 3B).

In the above embodiments, the display screen 120 displays all click images of all object images corresponding to the content of the picture P1 that matches all characteristic parameters. For example, when the content of the picture P1 has N object images matching N characteristic parameters, the display screen 120 will display N click images, wherein N is a positive integer. However, in another embodiment, the display screen 120 only displays some of all click images.

In another embodiment, since the first display portion P11 of the picture P1 of FIG. 3A already contains the second object image A2 (the display frame R1 of the display screen 120 of FIG. 3B displays the second object image A2), in step S160, the image superimposing unit 130 does not need to superimpose the second click image B2 on the first display portion P11 of the picture P1 because the display frame R1 of the display screen 120 already displays the second object image A2. Thus, the display screen 120 of FIG. 3B does not display the second click image B2. Similarly, since the second display portion P12 of the picture P1 of FIG. 3A already contains the first click image A1 (the display frame R1 of the display screen 120 of FIG. 3C displays the first click image A1), in step S160, the image superimposing unit 130 does not need to superimpose the first click image B1 on the second display portion P12 of the picture P1 because the display frame R1 of the display screen 120 already displays the first click image A1. Thus, the display screen 120 of FIG. 3C does not display the first click image B1.

To summarize, in an embodiment, when the content of the picture P1 has N object images matching N characteristic parameters, the display screen 120 will display all of the N click images not matter whether the display screen 120 already displays the object images or not. In another embodiment, when the display screen 120 already displays m of the N object images, the display screen 120 will display the rest of the N click images (that is, (N−m) click images), wherein m is a positive integer smaller than N. In another embodiment, when the display screen 120 already displays all of the N object image, the display screen 120 does not need to display any click images. In other embodiments, when the display screen 120 does not display any of the N object images, the display screen 120 can display all of the N click images.

In the above embodiments, the first display portion P11 and the second display portion P12 respectively are exemplified by a part of the picture P1. However, in another embodiment, the first display portion P11 and the second display portion P12 both can be the full picture P1. Detailed descriptions are disclosed below with FIGS. 4A~4B.

Figure 4A:
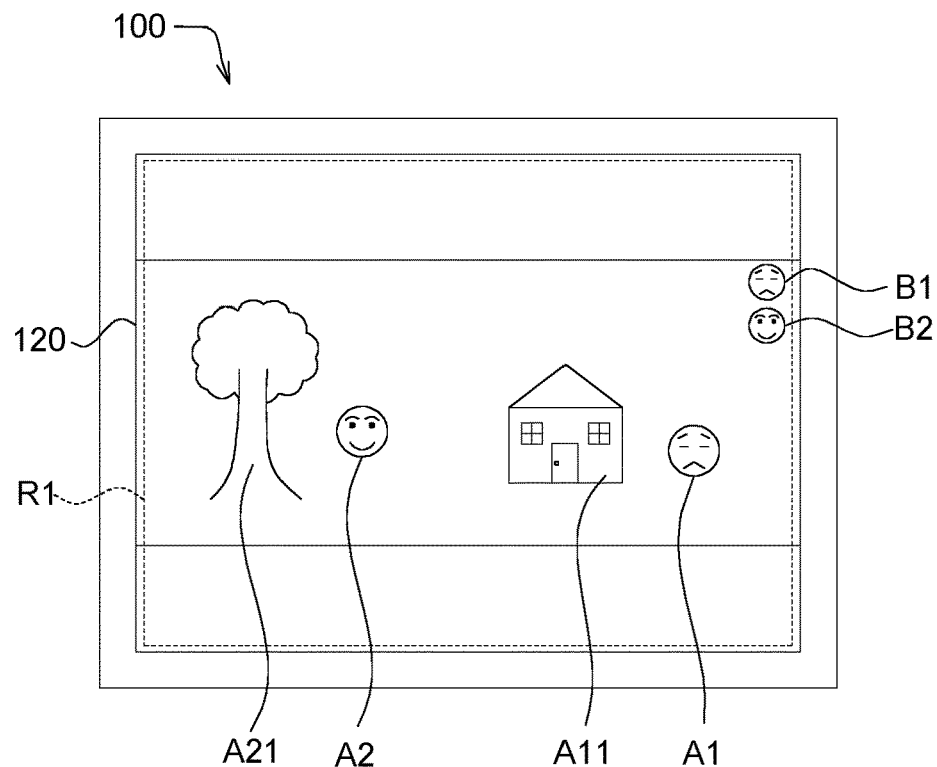
FIG. 4A is a schematic diagram of a display screen showing a first display portion according to another embodiment of the present invention.
Figure 4B:
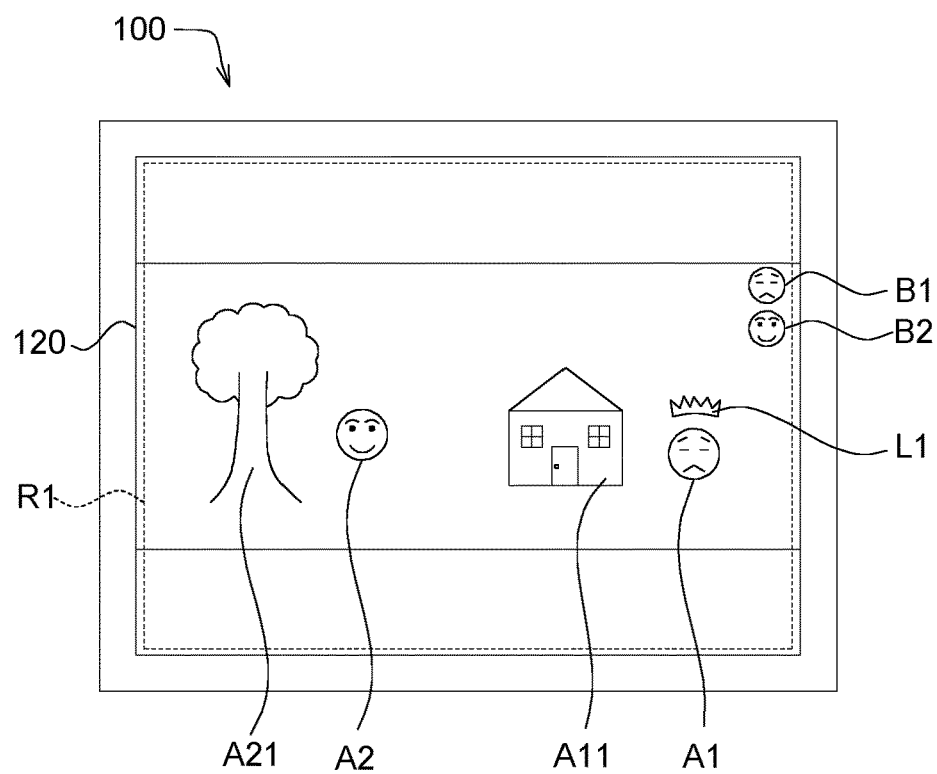
FIG. 4B is a schematic diagram of a display screen showing a second display portion according to another embodiment of the present invention.

Refer to FIGS. 4A and 4B. FIG. 4A is a schematic diagram of a display screen 120 showing a first display portion P11 according to another embodiment of the present invention. FIG. 4B is a schematic diagram of a display screen 120 showing a second display portion P12 according to another embodiment of the present invention.

In step S170 of FIG. 2, as indicated in FIG. 4A, the display screen 120 displays the first display portion P11. In the present embodiment, the first display portion P11 is exemplified by the full picture P1. In step S180 of FIG. 2, in response to the operation of selecting the superimposed first click image B1, the display screen 120 displays the second display portion P12 of the picture P1. In the present embodiment, as indicated in FIG. 4B, the second display portion P12 is exemplified by the full picture P1, wherein the second display portion P12 contains the first object image A1, the background image A11, the second object image A2, and the background image A21.

Besides, as indicated in FIG. 4B, in order to highlight the position of the first object image A1, the image superimposing unit 130 can superimpose the indication image L1 on the first object image A1 of the second display portion P12. When the display screen 120 displays the full picture P1, the first object image A1, the background image A11, the second object image A2 and the background image A21 will be too close to each other (squeezed together) or even may overlap with each other. However, through the guidance of the indication image L1, the user can quickly locate the object image corresponding to the selected click image. Other steps of the present embodiment are similar or identical to the corresponding steps of FIG. 2, and are not repeated here.

Figure 5:
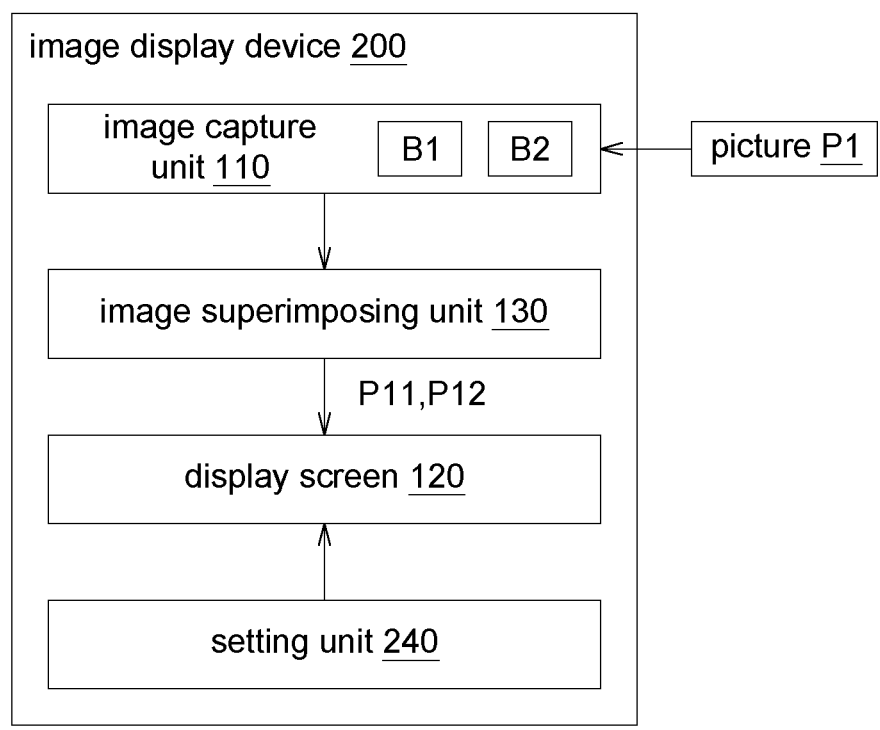
FIG. 5 is a functional block diagram of an image display device according to another embodiment of the present invention.
Figure 6:
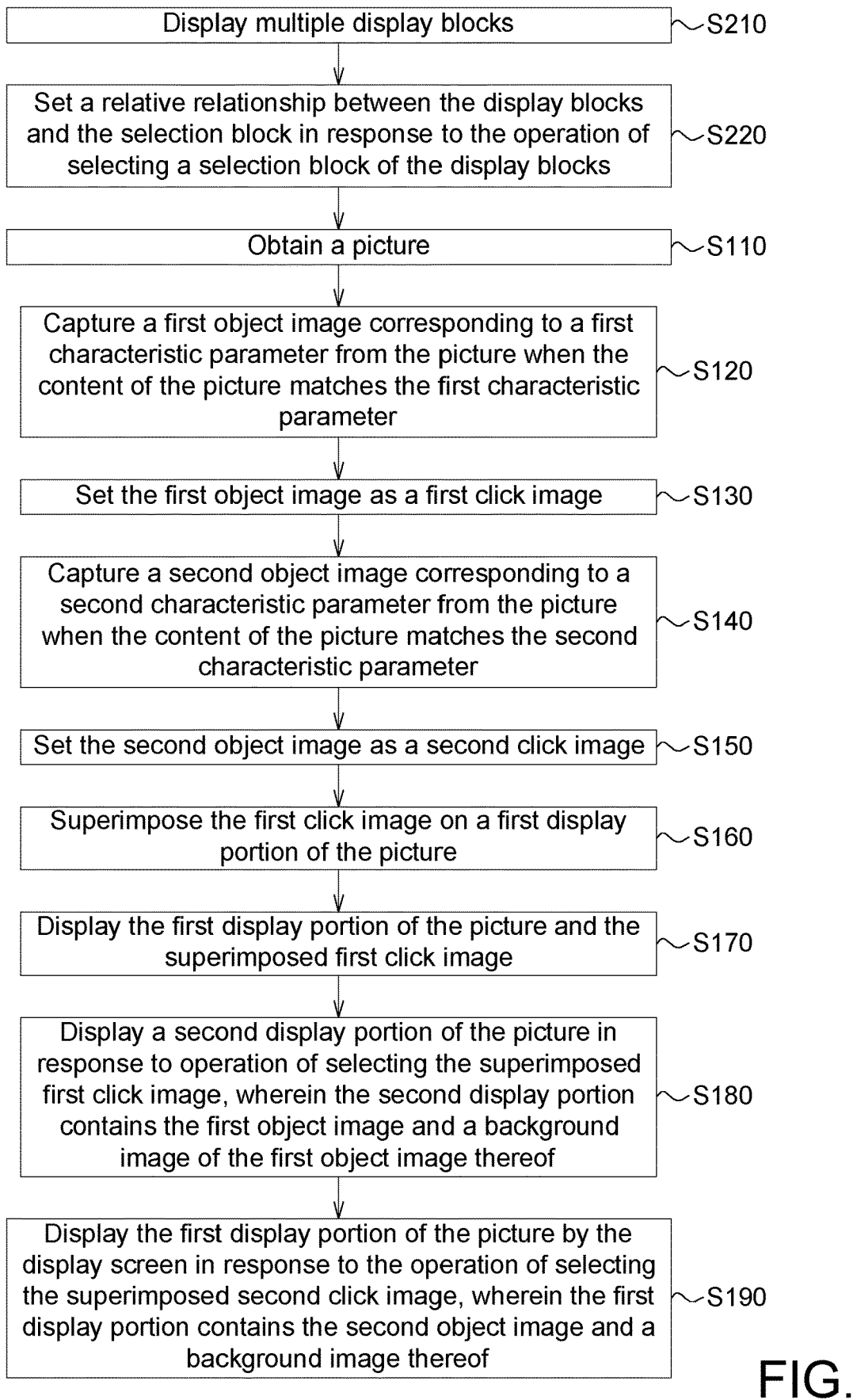
FIG. 6 is a flowchart of an image display method according to another embodiment of the present invention.
Figure 7A:
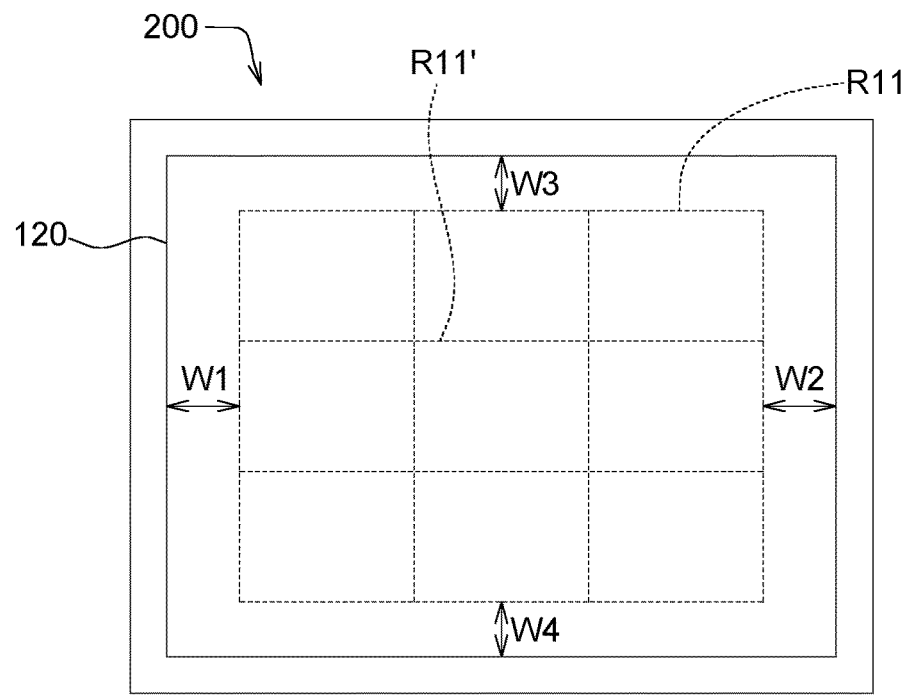
FIG. 7A is a schematic diagram of multiple display blocks according to an embodiment of the present invention.
Figure 7B:
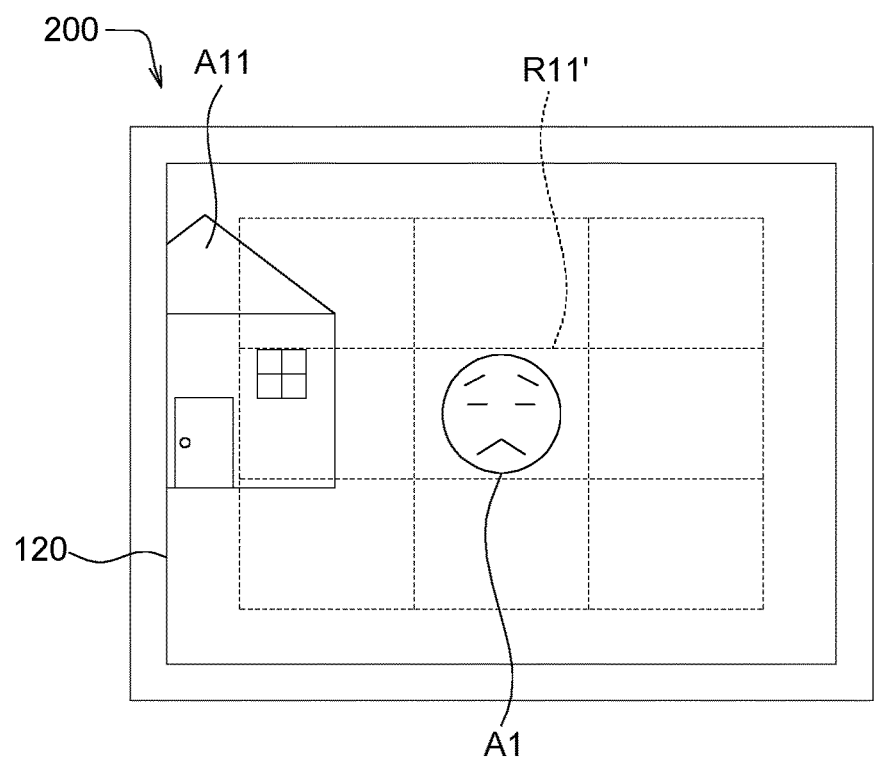
FIG. 7B a schematic diagram of the display screen of FIG. 7A showing a second display portion of the picture.

Refer to FIGS. 5, 6 and 7A~7B. FIG. 5 is a functional block diagram of an image display device 200 according to another embodiment of the present invention. FIG. 6 is a flowchart of an image display method according to another embodiment of the present invention. FIG. 7A is a schematic diagram of multiple display blocks R11 according to an embodiment of the present invention. FIG. 7B a schematic diagram of the display screen 120 of FIG. 7A showing a second display portion P12 of the picture P1.

As indicated in FIG. 5, the image display device 200 includes an image capture unit 110, a display screen 120, an image superimposing unit 130 and a setting unit 240. The image capture unit 110, the image superimposing unit 130 and/or the setting unit 240 can be realized by hardware or software or firmware formed of programming codes, wherein the hardware can be a circuit formed by at least one semiconductor process. Besides, at least two of the image capture unit 110, the image superimposing unit 130 and the setting unit 240 can be integrated as one unit. In another embodiment, the image display device 200 further includes a controller (not illustrated) configured to receive a signal from the image capture unit 110, the image superimposing unit 130 and/or the setting unit 240 for controlling the image capture unit 110, the display screen 120, the image superimposing unit 130 and/or the setting unit 240.

Detailed descriptions of the image display method according to an embodiment of the present invention are disclosed below with FIGS. 7A and 7B.

In step S210, as indicated in FIG. 7A, multiple display blocks R11 are displayed on the display screen 120. In the present embodiment, the number of display blocks R11 can be 9. However, the number of display blocks R11 can also be 2, 2 above, or 9 above. In another embodiment, the number of display blocks R11 can be determined according to a pre-set value or a user instruction (not illustrated). The user can input the user instruction through a user interface (not illustrated) provided by the display screen 120. In an embodiment, based on the left boundary width W1, the right boundary width W2, the top boundary width W3 and the bottom boundary width W4 of the overall region of the multiple display blocks R11, the display screen 120 can firstly determine the overall positions of the multiple display blocks R11 before displaying the multiple display blocks R11. The boundary widths can be determined according to a pre-set value or a user instruction (not illustrated). The user can input the user instruction through a user interface (not illustrated) provided by the display screen 120.

In step S220, in response to the operation of selecting the selection block R11' of the display blocks R11, a relative relationship between the display blocks R11 and the selection block R11' is set by the setting unit 240. For example, the user can freely select a selection block R11' from the display blocks R11. Then, the setting unit 240 can set the relative relationship between the display blocks R11 and the selection block R11'.

Step S110 to step S170 are similar or identical to corresponding steps disclosed above, and are not repeated here.

In step S180, as indicated in FIG. 7B, in response to the operation of selecting the superimposed first click image B1, a second display portion P12 of the picture P1 is displayed on the display screen 120, wherein the second display portion P12 contains a first object image A1 and a background image A11 thereof. According to the relative relationship, the display screen 120 displays the first object image A1 on the selection block R11', but does not change the relative relationship between the background image A11 and the first object image A1.

Successive steps of the image display method of the present embodiment are similar to corresponding steps of FIG. 2, and are not repeated here.

To summarize, through the setting of the display blocks of the present embodiment, the object image of the selected click image can be displayed in an expected block (that is, the selection block) from which the user can quickly locate the target object image.

Figure 8:
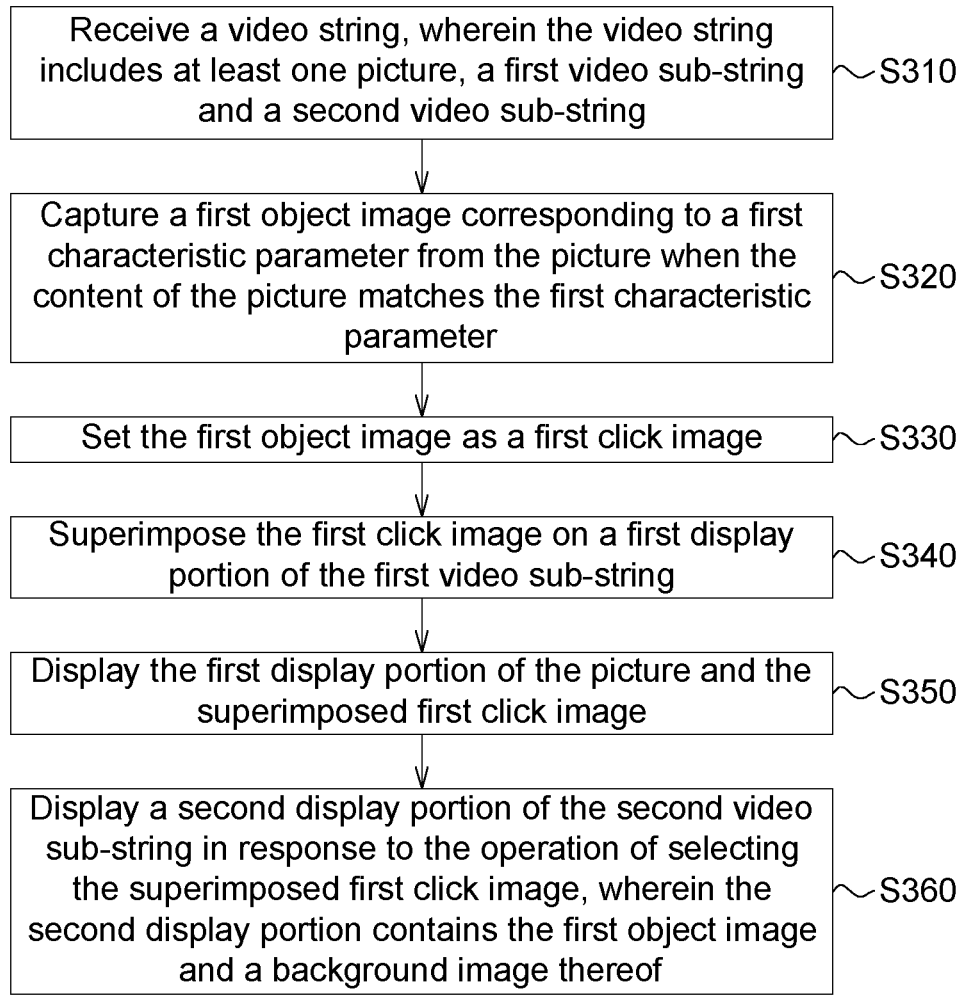
FIG. 8 is a flowchart of an image display method according to another embodiment of the present invention.
Figure 9:
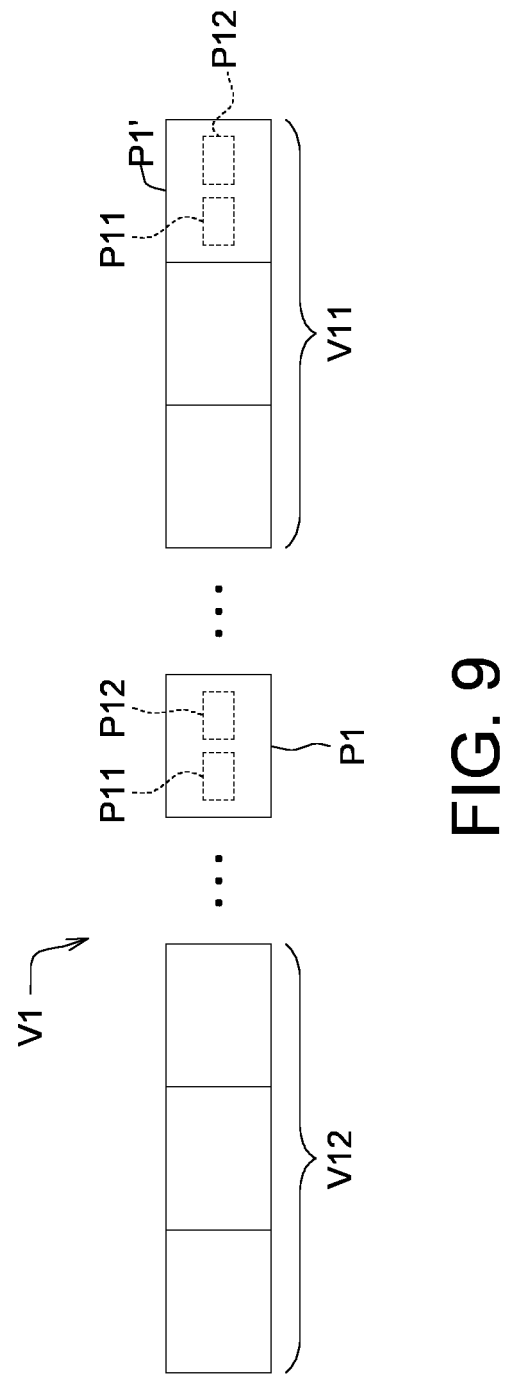
FIG. 9 a schematic diagram of a video string according to an embodiment of the present invention.

In the above embodiment, the image display method is exemplified by the processing of one picture P1 (static). However, in another embodiment, the image display method can be exemplified by the processing of a dynamic video string. Detailed descriptions of the above exemplification are disclosed below Refer to FIGS. 8 and 9. FIG. 8 is a flowchart of an image display method according to another embodiment of the present invention. FIG. 9 a schematic diagram of a video string V1 according to an embodiment of the present invention. To avoid the drawing becoming too complicated, FIG. 9 does not illustrate the first object image A1 and the first click image B1. The image display method of the present embodiment can be implemented using the image display device 100 or 200.

In step S310, a video string V1 is received by the image capture unit 110, wherein the video string V1 includes at least one picture P1, a first video sub-string V11 and a second video sub-string V12. The video string V1 can be the video string obtained using the real-time photography of the image display device, the video string stored in the image display device, or the video string can be obtained from an external source (such as an electronic device or a server of the Internet).

Additionally, the timing of the first video sub-string V11 can be latter than that of the second video sub-string V12. For example, the second video sub-string V12 is a video string that has been played, and the first video sub-string V11 is the video string being played currently. The picture P1 can be one of all pictures of the video string V1, such as a picture of the first video sub-string V11, a picture of the second video sub-string V12, or a picture other than the pictures of the first video sub-string V11 and the second video sub-string V12. The timing of the picture P1 can be between the timing of the first video sub-string V11 and the timing of the second video sub-string V12 or earlier than that of the first video sub-string V11.

In step S320, a first object image A1 corresponding to a first characteristic parameter is captured is captured by the image capture unit 110 from the picture P1 when the content of the picture P1 matches a first characteristic parameter.

In step S330, the first object image A1 is set by the image capture unit 110 as a first click image B1.

In step S340, the first click image B1 is superimposed on the first display portion P1 of the first video sub-string V11 by the image capture unit 110. For example, the first click image B1 is superimposed on each of the multiple pictures of the first video sub-string V11, such that the display screen 120 can continue to display the first click image B1 in successive steps for the user to click whenever necessary.

In step S350, the first display portion P11 is displayed on the display screen 120 and the superimposed first click image B1.

In step S360, a second display portion P12 of the second video sub-string V12 is displayed on the display screen 120 in response to the operation of selecting the superimposed first click image B1, wherein the second display portion P12 contains the first object image A1 and a background image A11 thereof. For example, the display screen 120 can display the second display portion P12 of each of the multiple pictures of the second video sub-string V12 to continue to display the first object image A1 and the background image A11 for the user to grasp the state of the first object image A1.

To summarize, the first click image B1 of the picture P1 captured from the video string V1 the can be superimpose on the multiple pictures other than the picture P1 of the first video sub-string V11, so that the display screen 120 can continue to display the first click image B1 for the user to click whenever necessary. When the user selects the first click image B1, the display screen 120 displays the second video sub-string V12 containing the first object image A1 and the background image A11 (such as the multiple pictures of the second video sub-string V12), wherein the second video sub-string V12 can be a historical video string that has been played.

In another embodiment, in step S360, in response to the operation of selecting the superimposed first click image B1, when the first object image A1 is located in the current picture P1' of the video string V1, the second display portion P12 of the current picture P1' is displayed on the display screen 120, wherein the first object image A1 is located inside the second display portion P12 of the current picture P1'. Conversely, when the first object image A1 is not located in the current picture P1', a message indicating that the first object image A1 is not located in the current picture P1' is displayed on the display screen 120 to inform the user that no object image matching the characteristic parameter is found in the current picture P1' of the video string V1. The said "message" can be a text.

To summarize, the image display device can play the video string V1 including multiple pictures. The image display device can capture the pictures whose object image matches the characteristic parameter from the video string V1 (for example, the pictures are captured in order) as click images, superimpose the captured pictures on the first display portion of the first picture of the video string V1, and further display the first display portion for the user to select. The first display portion can be a partial or a full first picture, and the first picture can be the picture being displayed currently. For the content of each picture of the video string V1, as the play time proceeds, the number of the click images of the current picture may increase or may maintain the same. When one of the at least one click image being displayed currently is selected by the user, the image display device will display a second display portion of the video string V1, wherein the second display portion contains object image corresponding to the selected click image and a background image thereof. The second display portion can be a partial or a full second picture of the video string V1. The second picture can be the first picture itself, or a picture other than the first picture. The timing of the second picture can be earlier than or latter than that of the first picture.

While the invention has been described by way of example and in terms of the preferred embodiment (s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An image display method, comprising:
   obtaining a picture;
   capturing a first object image corresponding to a first characteristic parameter from the picture when the content of the picture matches the first characteristic parameter;
   setting the first object image as a first click image;
   superimposing the first click image on a first display portion of the picture;
   displaying the first display portion of the picture and the superimposed first click image; and
   displaying a second display portion of the picture in response to operation of selecting the superimposed first click image, wherein the second display portion contains the first object image and a background image of the first object image thereof.

2. The image display method according to claim 1, wherein the first display portion and the second display portion both are parts of the picture, and the image display method further comprising:
   capturing a second object image corresponding to a second characteristic parameter from the picture when the content of the picture matches the second characteristic parameter; and
   setting the second object image as a second click image.

3. The image display method according to claim 2, the step of displaying
   the first display portion of the picture comprising:
   superimposing the first click image and the second click image on the first display portion.

4. The image display method according to claim 3, wherein the second object image is located inside the first display portion, the first object image is located outside the first display portion, and the image display method further comprising:
   displaying the first display portion of the picture in response to operation of selecting the superimposed second click image, wherein the first display portion contains the second object image and a background image of the second object image thereof.

5. The image display method according to claim 2, the step of the operation of selecting the superimposed first click image comprising:
   superimposing an indication image on the first object image in the second display portion.

6. The image display method according to claim 2, the image display method further comprising:
   displaying a plurality of display blocks;
   setting a relative relationship between the display blocks and the selection block in response to the operation of selecting a selection block of the display blocks; and
   displaying the first object image on the selection block according to the relative relationship in the step of displaying the second display portion of the picture.

7. The image display method according to claim 1, wherein the first display portion and the second display portion both are the full picture;
   the step of the operation of selecting the superimposed first click image comprising: superimposing an indication image on the first object image in the second display portion.

8. The image display method according to claim 1, wherein the picture is a spherical image, a cylindrical image or a wide view image.

9. An image display device, comprising:
   an image capture unit configured to:
      obtain a picture;
      capture a first object image corresponding to a first characteristic parameter from the picture when a content of the picture matches the first characteristic parameter; and
      set the first object image as a first click image;
   an image superimposing unit configured to superimpose the first click image on a first display portion of the picture; and
   a display screen configured to display the first display portion and the superimposed first click image;
   wherein the display screen contains the first object image and a background image of the first object image thereof and is further configured to display a second display portion of the picture in response to operation of selecting the superimposed first click image.

10. The image display device according to claim 9, wherein the first display portion and the second display portion both are a part of the picture, and the image display method further comprises:

capturing a second object image corresponding to a second characteristic parameter from the picture when the content of the picture matches the second characteristic parameter; and setting the second object image as a second click image.

11. The image display device according to claim 10, wherein the display screen is further configured to superimpose the first click image and the second click image on the first display portion.

12. The image display device according to claim 11, wherein the second object image is located inside the first display portion, the first object image is located outside the first display portion, and the display screen is further configured to:

display the first display portion of the picture in response to operation of selecting the superimposed second click image, wherein the first display portion contains the second object image and a background image thereof.

13. The image display device according to claim 10, wherein the image superimposing unit is further configured to:

superimpose an indication image on the first object image in the second display portion in response to the operation of selecting the superimposed first click image.

14. The image display device according to claim 10, wherein the display screen is further configured to display a plurality of display blocks, and the display device further comprises:

a setting unit configured to set a relative relationship between the display blocks and the selection block in response to the operation of selecting a selection block of the display blocks;

wherein the display screen is further configured to display the first object image on the selection block according to the relative relationship.

15. The image display device according to claim 9, wherein the first display portion and the second display portion both are the full picture, and the image superimposing unit is further configured to superimpose an indication image on the first object image in the second display portion.

16. The image display device according to claim 9, wherein the picture is a spherical image, a cylindrical image or a wide view image.

* * * * *